United States Patent
Robertson, Jr. et al.

(10) Patent No.: US 9,939,619 B1
(45) Date of Patent: Apr. 10, 2018

(54) OPTICAL STACK FOR PANORAMIC OPTICAL DEVICE

(71) Applicant: VSN TECHNOLOGIES, INC., Fort Lauderdale, FL (US)

(72) Inventors: William H. Robertson, Jr., Fort Lauderdale, FL (US); John Shemelynce, Fort Lauderdale, FL (US); Julio A. Abdala, Southwest Ranches, FL (US); Gary Peterson, Center City, MN (US); Patricio Durazo, Tucson, AZ (US); Mark Fink, Tucson, AZ (US)

(73) Assignee: HOYOS INTEGRITY CORPORATION, San Juan, PR (US)

( * ) Notice: Subject to any disclaimer, the term of this patent is extended or adjusted under 35 U.S.C. 154(b) by 771 days.

(21) Appl. No.: 14/340,348

(22) Filed: Jul. 24, 2014

(51) Int. Cl.
*H04N 7/00* (2011.01)
*G02B 13/06* (2006.01)
*G02B 17/08* (2006.01)
*H04N 5/232* (2006.01)

(52) U.S. Cl.
CPC ......... *G02B 13/06* (2013.01); *G02B 17/0852* (2013.01); *H04N 5/23238* (2013.01)

(58) Field of Classification Search
None
See application file for complete search history.

(56) References Cited

U.S. PATENT DOCUMENTS

| | | | | |
|---|---|---|---|---|
| 6,313,865 B1* | 11/2001 | Driscoll, Jr. | ........... | G02B 13/06 348/36 |
| 2004/0252384 A1* | 12/2004 | Wallerstein | ............ | G02B 13/06 359/725 |
| 2008/0068452 A1* | 3/2008 | Nakao | .................. | G02B 3/0075 348/36 |
| 2010/0231137 A1* | 9/2010 | Keh | ..................... | G09G 3/3406 315/287 |
| 2011/0228174 A1* | 9/2011 | Lai | ....................... | H04N 9/3155 348/744 |

\* cited by examiner

*Primary Examiner* — James M Anderson, II
(74) *Attorney, Agent, or Firm* — Patents on Demand P.A.; Brian K. Buchheit

(57) ABSTRACT

A panoramic optical device includes a quadric reflector, a mirror, and a set of one or more optical elements. The quadric reflector has a conical shape, which tapers from a wide base to an apex. The apex includes an aperture. The mirror is positioned within the device in a plane approximately parallel to a circular cross section of the conical shape. The mirror reflects environmental light that is reflected by the quadric reflector into the aperture or reflecting light emitting from the aperture onto the quadric reflector. The set of one or more optical elements are positioned at least partially within a volumetric region of the quadric reflector. The one or more optical elements focus light passing through the aperture.

16 Claims, 4 Drawing Sheets

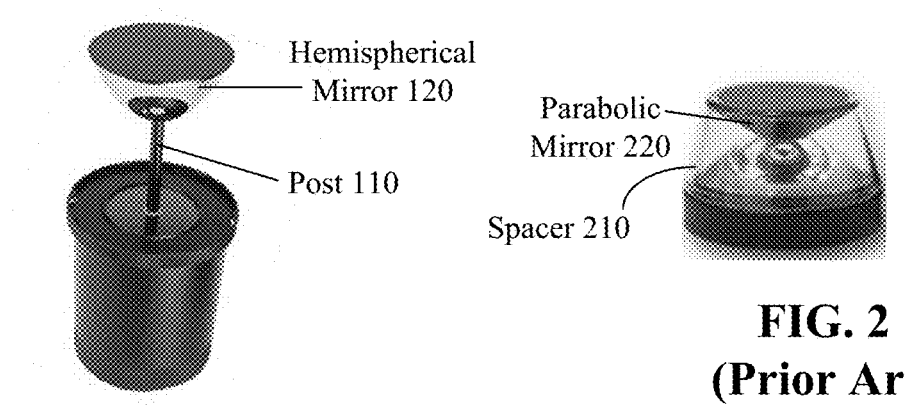
**FIG. 1
(Prior Art)**
**FIG. 2
(Prior Art)**
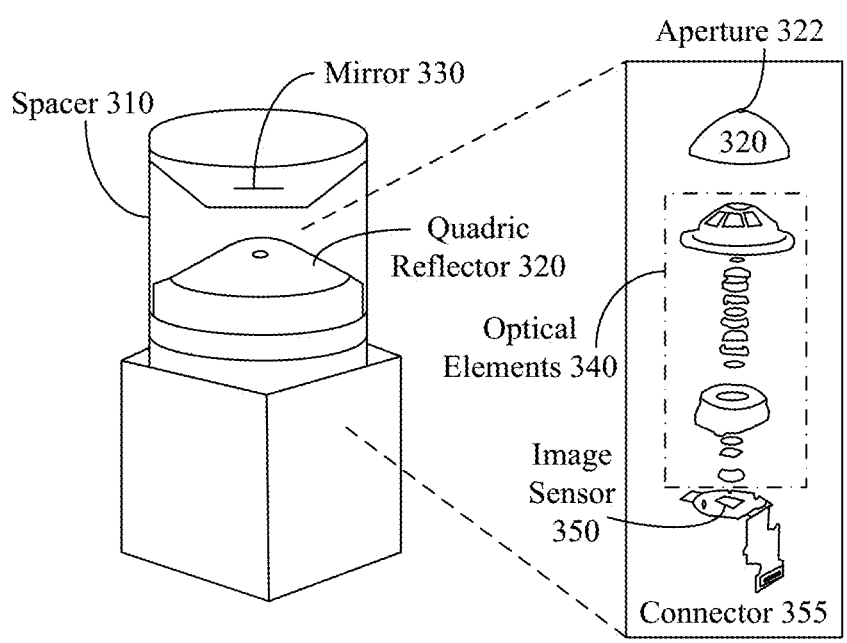
FIG. 3

OPTICAL STACK FOR PANORAMIC OPTICAL DEVICE

BACKGROUND

The present invention relates to the panoramic optical device and, more particularly, to an optical stack for a panoramic optical device.

Providing high quality optics in a panoramic camera is challenging. Different approaches have been taken for this problem. One approach is to move a lens and to capture a set of images as the lens moves, which cover a field of view over time. The images from the moved lens are combined to form panoramic scene. Another approach is to form an array of multiple different camera lenses and to combine the image results captured by the array of lenses into a single image. Still another is to utilize an ultra-wide angle lens (e.g., a fish-eye lens) to capture a scene with a wider-than-normal field of view. Yet another is to use a panoramic optical device to create a 360 degree horizontal field of view using a single shot (a discrete point of time using a single lens). This later approach is sometimes referred to as a "one-shot" panoramic device, which captures a panoramic scene in a single point in time using a single lens. Each of these approaches has benefits and drawbacks depending on use cases.

Within one-shot solutions that use panoramic optical components, a number of approaches have been taken depending on situation. One approach shown in FIG. 1 (Prior Art) utilizes a hemispherical mirror 120 positioned at the end of a thin post 110. The post 110 sometimes attaches to filter threads of a camera lens. The hemispherical mirror 110 tapers to a point, as it approaches the center of the post 110 to which it is attached. Images captured by this technique are distorted, but can be software corrected using digital signal processing (DSP) techniques.

A different one-shot approach shown in FIG. 2 (Prior Art) utilizes a parabolic mirror 220 connected to a clear spacer 210. The parabolic mirror 220 tapers to a point as it approaches a lens. DSP software/firmware techniques are able to be used to correct for distortions resulting from light being reflected off the parabolic mirror 220.

Conventional panoramic one-shot solutions (such as those shown in FIG. 1 and FIG. 2) are unable to produce high-fidelity (HD) images and are highly restricted in their vertical field of view. An inability to produce high-fidelity images (referring to a 1080-line high definition video (HDV) standard) results in part from an optical scatter from the outwardly expanding mirror. Additional, conventional panoramic one-shot solutions have a horizontal field of view of 360 degrees and a limited vertical field of view. The vertical field of view and fidelity is restricted based on optics of reflecting light from a single hemispherical mirror 120 or off a single parabolic mirror 220 before being captured by a lens/sensor.

BRIEF SUMMARY

One aspect of the disclosure describes a panoramic optical device that includes a quadric reflector, a mirror, and a set of one or more optical elements. The quadric reflector has a conical shape, which tapers from a wide base to an apex. The apex includes an aperture. The mirror is positioned within the device in a plane approximately parallel to a circular cross section of the conical shape. The mirror reflects environmental light that is reflected by the quadric reflector into the aperture or reflecting light emitting from the aperture onto the quadric reflector. The set of one or more optical elements are positioned at least partially within a volumetric region of the quadric reflector. The one or more optical elements focus light passing through the aperture.

Another aspect of the disclosure describes a device that includes a quadric reflector and a mirror. The quadric reflector has a conical shape, which tapers from a wide base to an apex. The apex includes an aperture. The mirror is positioned within the device in a plane substantially parallel to a circular cross section of the conical shape. The mirror reflects environmental light that is reflected by the quadric reflector into the aperture or reflecting light emitting from the aperture onto the quadric reflector.

Another aspect of the disclosure describes a device that includes a set of one or more optical elements, and an image sensor. The one or more optical elements are positioned at least partially within a volumetric region of a quadric reflector. The one or more optical elements focus light passing through an aperture of the quadric reflector. The set of one or more optical elements includes at least one doublet and a field flattener. The at least one doublet includes one convex element joined to one concave element. The convex and concave portions face each other. The at least one doublet produces a converging beam of light and corrects color aberrations that would otherwise cause different colors to focus at different planes and positions. The field flattener corrects field curvature resulting from the quadric reflector to permit the optical image to substantially lie on a flat focal plane. The image sensor converts an optical image into an electronic signal. The optical image results from light being focused by the set of one or more optical elements, to be received by the image sensor.

BRIEF DESCRIPTION OF THE SEVERAL VIEWS OF THE DRAWINGS

FIG. 1 (Prior Art) shows a one shot panoramic optical device having a hemispherical mirror positioned at the end of a thin post.

FIG. 2 (Prior Art) shows a one shot panoramic optical device having a parabolic mirror connected to a clear spacer.

FIG. 3 shows a panoramic optical device having a quadric reflector and a mirror in accordance with embodiments of the disclosure.

DETAILED DESCRIPTION

Figure 4:
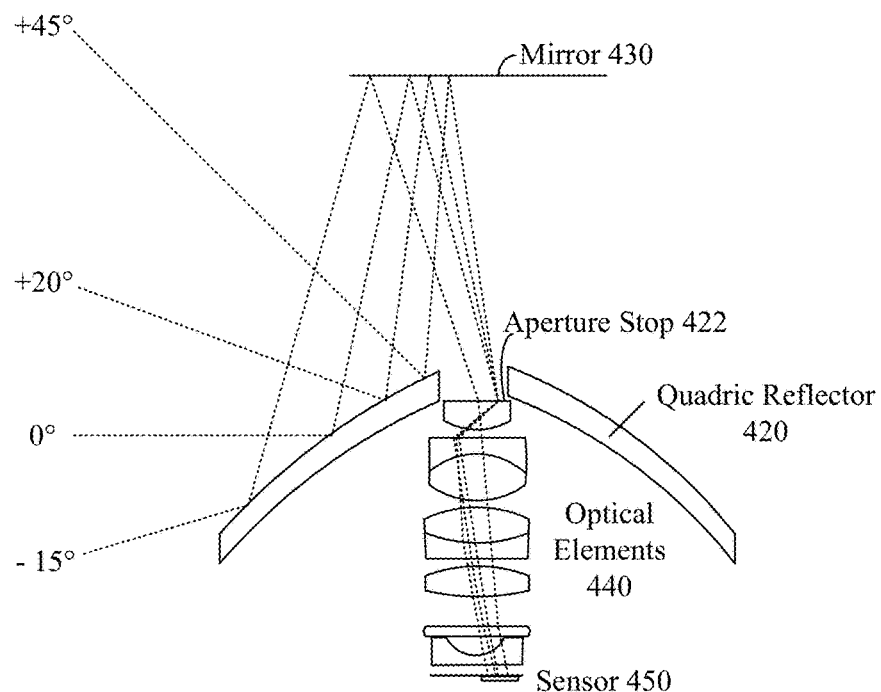
FIG. 4 shows a ray trace diagram of light reflecting off the quadric reflector at different angles in accordance with embodiments of the disclosure.

The present disclosure is a solution for a panoramic optical device. The panoramic device can be a one-shot image capture device able to capture images or video in a three hundred and sixty degree horizontal field of view. The device uses a quadric reflector (e.g., a parabolic, hyperbolic, or elliptical mirror) having an aperture within its apex. Light is reflected off the quadric reflector to a mirror, which reflects the light through the aperture. An image sensor on an opposite side of the aperture from the mirror receives and processes the reflected light. Images captured by the image sensor can be manipulated via software/firmware algorithms using a variety of digital signal processing (DSP) techniques to ultimately create panoramic images.

In a different embodiment, image sensors of the panoramic optical device can be replaced with a light emission source, such as pico-projector components or a set of colored light emitting diodes (LEDs). When configured as a pico-projector, the panoramic optical device can play back images captured by the one-shot camera. When configured with light emitting diodes, the panoramic optic device can produce a light show of timed/spaced colors within a three hundred and sixty degree horizontal field of view.

Regardless of the embodiment, the panoramic optical device may be implemented as a stand-alone device or as a peripheral device. Consequently, the panoramic optical device may include one or more processors, one or more memories (volatile and non-volatile), and program instructions stored in the memory able to be executed by the one or more processors. A network transceiver or other communication component (such as a communication bus) may also be included within the panoramic optical device along with a power source (battery or line-based power). User input elements (buttons, a touch-screen, a microphone for receiving voice input, an on/off switch) are included in some, but not all embodiments of the panoramic optical device. User output elements, such as a small screen, status buttons, power level indicator, and the like are included in some, but not all embodiments of the panoramic optical device. The panoramic optical device is able to use wireless communication technologies (or alternatively wired ones) to communicate with other proximate devices. Images and/or control signals can be conveyed to/from the panoramic optical device over a communication connection. Different embodiments are contemplated for the panoramic optical devices, which are described herein.

Referring to FIG. 3, a panoramic optical device is shown and described in accordance with embodiments of the disclosure. The device includes a quadric reflector 320, a reflecting mirror 330, and a spacer 310, though which light passes. The quadric reflector 320 includes a hole or aperture 322 in its apex.

In one embodiment, a set of components included in a base of the panoramic optical device includes optical elements 340 and an image sensor 350 electrically coupled to connector 355. The optical elements 340 guide light reflected off mirror 320 to strike sensor 350. The optical elements may also filter undesired optical wavelengths, correct for color aberrations that would otherwise cause different colors to focus at different planes and positions, and/or ensure despite distortions from the quadric reflector 320 that the optical image substantially lays on a flat focal plane.

In another embodiment, the set of components can include a light emitter, such as a pico-projector chipset or a set of light emitting diodes (LEDs) of varying colors, which permits the panoramic optical device to become a light/image projector instead of an image capture device.

The quadric reflector 320 is a reflective conical surface, which may be a parabolic surface, a hyperbolic surface, a hemispherical surface, or an elliptic surface. More specifically, the quadric reflector 320 as used herein is a non-degenerate real quadratic surface that tapers from a wide base towards an apex, where the aperture 322 is positioned.

The image sensor 350 is a component that converts an optical image into an electronic signal. Any of a variety of image sensors technologies can be for the image sensor 350 including, but not limited to, semiconductor charge-coupled devices (CCD), active pixel sensors in complementary metal-oxide-semiconductor (CMOS), and N-type metal-oxide-semiconductor (NMOS, Live MOS) technologies.

In embodiments, where the image sensor 350 is replaced with a pico-projector, also referred to as a pocket projector, a mobile projector, a handheld projector or a mini beamer) any of a number of technologies can be utilized including, but not limited to digital light processing (DLP), MICROVISION's beam-steering, and LCoS (Liquid crystal on silicon) based technologies.

In one embodiment, positive elements of the optical elements 340 can be made from polymethyl methacrylate (PMMA, or acrylic), other transparent thermoplastic, glass, or other suitable substances. Negative ones of the optical elements 340 can be made of polycarbonate, other thermoplastic polymers, or other suitable substances.

In one embodiment, built-in position adjusting mechanisms can adjust alignment of the optical elements 340 relative to each other. This adjustment may be performed at a factory, after shipment to retail establishments, or by an end-user. Factor made adjustments are especially useful to ensure alignment is within suitable tolerances during a testing/refining stage post-assembly. The adjustments can ensure properly alignment of the optical elements 340 are properly calibrated and aligned.

In one embodiment, shock resistive/absorbing elements, such as springs or elastic members, can be used to stabilize the optical elements within a housing. Shock absorbing elements are especially important for embodiments designed to be mobile, such as where the camera device is designed for a moving vehicle, ship, train, helmet, and the like. In another embodiment, the housing can be water resistant/water proof. Embodiments are contemplated where the device is specifically configured for outdoor and inclement weather usage, where the device is buoyant and able to float on a surface of water, where the device is designed for underwater capture of a panoramic scene, and the like. In waterproof/water resistant embodiments, an air gap can be maintained within the interior volume separated from an outer environment by the spacer 310.

FIG. 4 shows a ray trace diagram of light reflecting off the quadric reflector 420 at different angles in accordance with embodiments of the disclosure. The reflected light strikes mirror 430 and is directed towards the aperture stop 422. From here, the light is guided by optical elements 440 so that it strikes sensor 450.

The angles shown are from the horizon. It should be appreciated that most one-shot cameras are unable to handle angles below the horizon, such as the negative fifteen degree angle. The positioning of the parabolic reflector 420 relative to the mirror 430 and the aperture stop 422 results in a substantially greater vertical field of view at high fidelity than is possible using conventional technologies.

The reflections off the mirror 430 result in different angles of light striking the aperture stop 422. The optic elements 440 focus and filter this light to strike the sensor 450. From a design perspective, the sensitive of the sensor 450 is paired to the optic elements 440, to maximum the fidelity of images (able to be read by the sensor 450), while minimizing costs of the optical elements 440, which have a significant expense due to necessary precision and tolerances. In this manner, a 4K image sensor (450) is able to be utilized with the panoramic optical device to produce high definition video (HDV) at 1080 lines or greater.

Unlike conventional one-shot devices, optical elements 440 and sensor 450 are protected within the curvature of the quadric reflector 420. This results in a compact form factor, where sensitive components are easier to protect than alternative technologies. For example the inverted hemisphere mirror 120 suspended by post 110 shown by FIG. 1 is highly prone to being damaged or degraded when used. Even mirror imperfections in the inverted and suspended hemisphere mirror 120 result in major optical degradations. In contrast, the disclosed quadric mirror 320, 420 is compacted and much more suitable to being protected by the base of an optical assembly.

Figure 5:
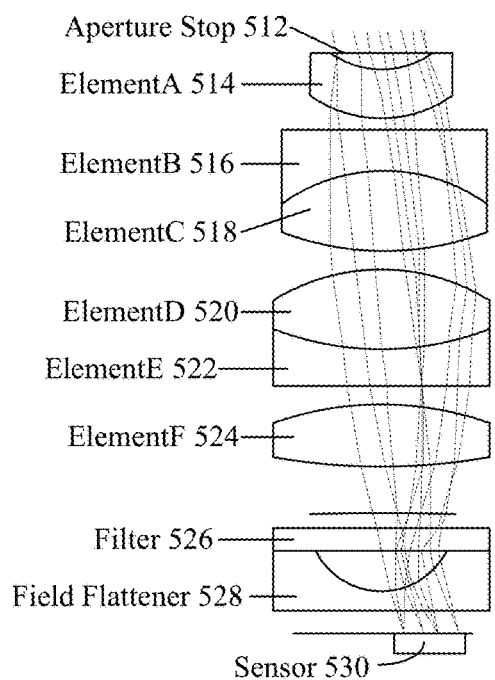
FIG. 5 shows optic elements of a panoramic optical device positioned between an aperture and an image sensor in accordance with embodiments of the disclosure.

FIG. 5 shows optic elements between the aperture stop 512 and the image sensor 530 in accordance with embodiments of the disclosure. In FIG. 5, the aperture stop 512 limits the bundle of light that passes through the optical elements. ElementA 514 captures light passing through the aperture stop and reduces its divergence. In one embodiment, cemented doublets can be formed from ElementB 516 and ElementC 518. ElementD 520 and ElementE 522 produce a converging beam and correct color aberrations that would otherwise cause different colors to be focused at different planes and positions. ElementF 524 increases convergence of the light. A flat filter 526 can be used to block infrared, violet, and ultraviolet radiation. The filtered wavelengths can blur the image and produce color rendering errors in some embodiments. The field flattener 528 corrects extreme field curvature in the virtual image within the parabolic reflector 420. The field flattener 528 results in the image sent to the sensor 530 lying flat on a focal plane. Not all elements 512-528 are needed in all embodiments and further elements (not shown) may be included in different contemplated embodiment of the disclosure.

Figure 6:
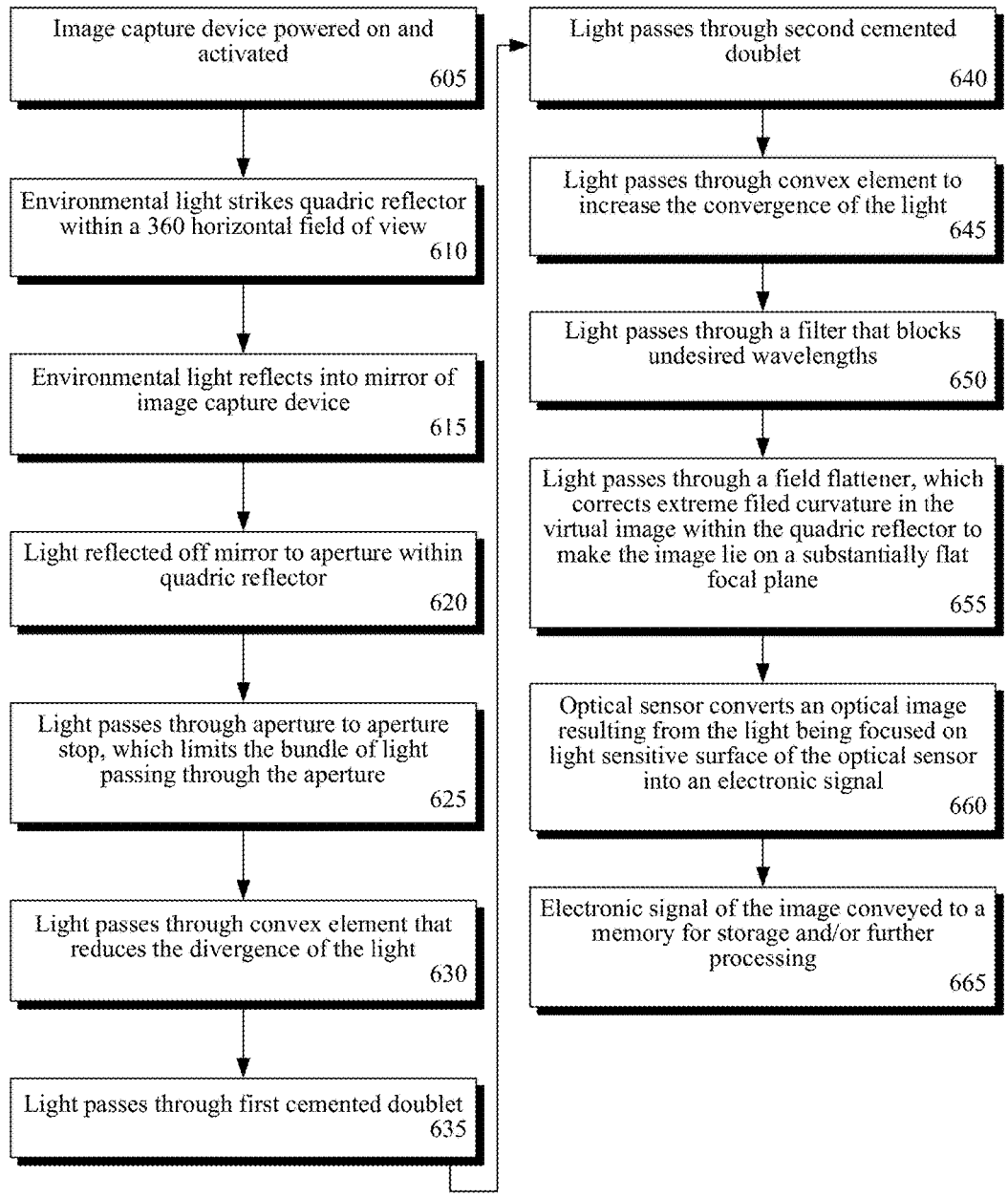
FIG. 6 shows a flow chart for a one shot panoramic camera in accordance with embodiments of the disclosure.

FIG. 6 shows a flow chart for a one shot panoramic camera in accordance with embodiments of the disclosure. The process can begin in step 605, where an image capture device is powered on and activated. In step 610, environmental light strikes a quadric reflector within a 360 horizontal field of view (FOV). Thus, a scene surrounding the optical device is concurrently captured within this 360. The vertical field of view depends on construction, but in one embodiment includes angles between negative fifteen degrees and positive 45 degrees. In step 615, environmental light reflects from the quadric reflector to a mirror of the one-shot panoramic camera. The mirror can be positioned directly above the aperture of the quadric reflector in one embodiment. The mirror may be substantially flat (within +/−five percent of being flat). In step 620, light reflected off the mirror can enter an aperture of the quadric reflector.

A set of optical elements can reside no an opposite side of the aperture in embodiments of the disclosure. The described optical elements need not be present in every contemplated configuration of the disclosure and additional elements may be included in contemplated configurations of the disclosure. In step 625, light can pass through the aperture to an aperture stop, which limits the bundles of light passing through. In step 630, light can pass through a convex element that reduces the divergence of the light. In step 635, light can pass through a first cemented doublet to pass through a second cemented doublet in step 640. These doublets can be paired to reduce divergence of the light then to increase convergence (see elements 516, 518, 520, and 522 of FIG. 5, for example). Other embodiments are contemplated, where a single doublet is utilized, or where multiple paired doublets (more than two) are utilized. In step 645, light passes through a filter that blocks undesired wavelengths. For example, infrared, violet, and/or ultraviolet wavelengths may be undesired in that they contribute to blurring the image and producing color rendering errors in some embodiments of the disclosure.

In step 655, light passes through a field flattener, which corrects for extreme curvature in the virtual image due to the conic shape of the quadric reflector. This makes the image lie on a substantially flat (within +/−10 percent of being flat) focal plane. In step 660, an optical sensor converts an optical image resulting from the light being focused on a light sensitive surface of the optical sensor into an electronic signal. In step 665, the electronic signal can be conveyed to a memory for storage and/or further processing. For example, a raw image can be saved to a non-transitory memory in one embodiment, which may be projected from a panoramic projector (see FIG. 7). The raw image may be later processed by a computing device. In another implementation, the electronic signal may be digitally processing, using a variety of digital signal processing techniques and saved post-processing to a non-transitory memory and/or be visually displayed on a screen as a panoramic scene.

Figure 7:
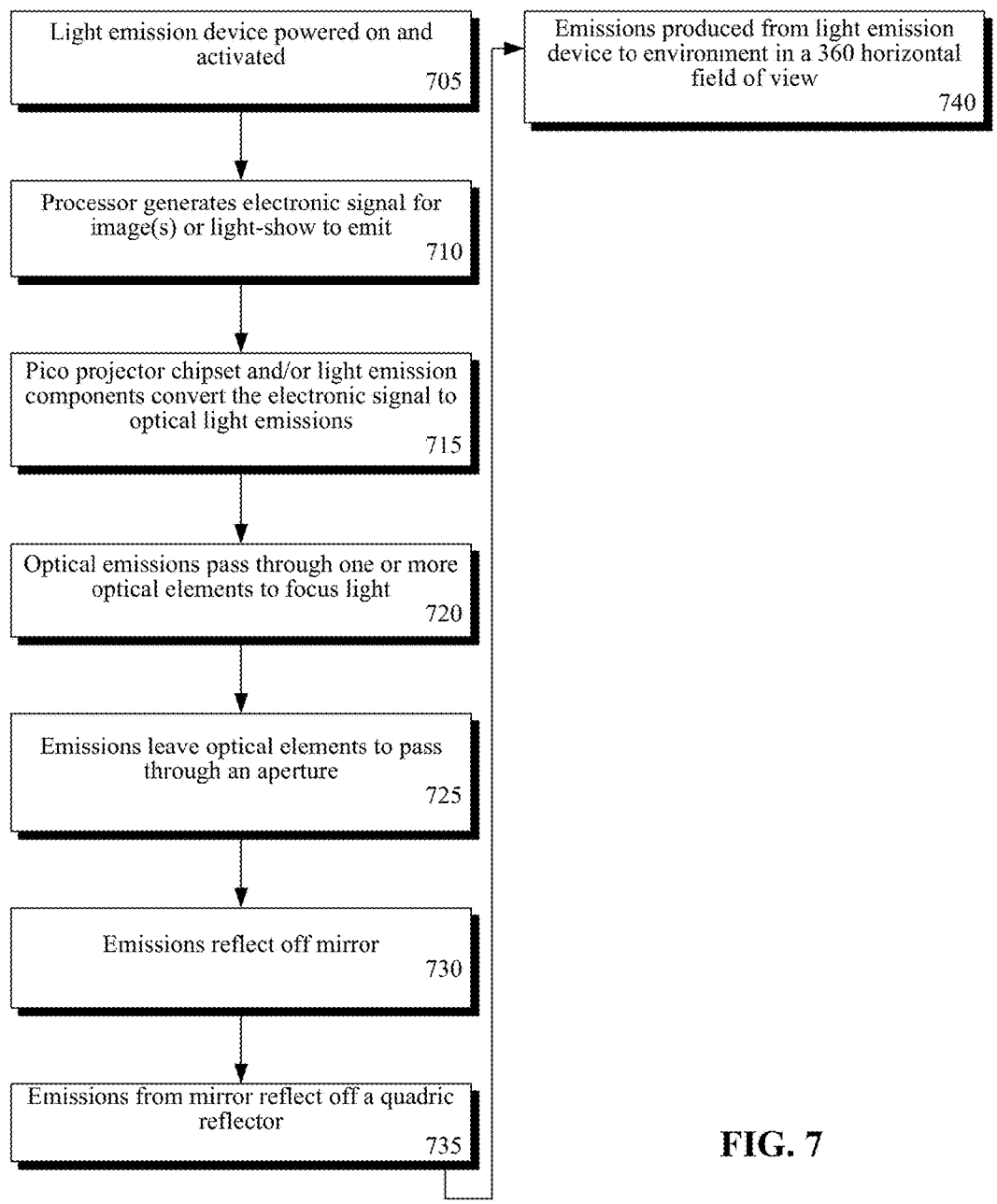
FIG. 7 shows a flow chart for a panoramic light emission device in accordance with embodiments of the disclosure.

FIG. 7 shows a flow chart for a panoramic light emission device in accordance with embodiments of the disclosure. The flow charted process can begin in step 705, where a light emission device is powered on and activated. In step 710, a processor can generate an electronic signal for images to be projected and/or for a light-show. A light show refers to a timed and spatially defined sequence of colors. In step 715, a pico-projector chipset and/or light emissions components can convert the electronic signal into optical light emissions. These emissions may optionally pass through one or more optical elements (e.g., elements 512-528 of FIG. 5) to focus or adjust the emissions in one embodiment. In step 725, the light emissions leave the optical elements to pass through an aperture. The aperture can be an aperture of a quadric reflector. In step 730, the light emissions can reflect of a mirror and onto a quadric reflector as indicted by step 735. In step 740, the emissions off the quadric reflector can emit in a 360 horizontal field of view into an environment.

Accordingly, embodiments of the disclosure herein provide the benefit of optical device include providing a horizontal three hundred and sixty degree image capture arch using a single image sensor. Using a single image sensor permits rapid video capture without stitching, thus processing times are saved and the true image of the surrounding environment without adjustment is preserved without digital signal processing induced distortions.

Unlike conventional implementations for one-shot cameras (FIGS. 1 and 2) no suspended hemispherical or parabolic mirror is positioned above the apex of an aperture within which the optical sensor is housed. Use of conversional posts (110) and/or suspended curved mirrors (220) result in significant distortions and limits angles available for the vertical field of view, where our use of a top mounted mirror 330 and a quadric reflector 320 overcomes these prior art limitations. Further, conversional implementations required positioning of a hemispherical mirror 120 and/or parabolic mirror 220 is an unstable, precarious position, which resulted in high incidents of damage to these sensitive surfaces. Using a quadric reflector 320 with an interior volume housing the optical elements 340 and image sensor 350 is a more protected and compact arrangement than previously possible. In an event of rough handling over time, removable a top-most portion consisting of a transparent spacer 310 and a mirror 330 may be replaced, while the most expensive and sensitive components (the quadric reflector 320, optical elements, and image sensor 350) remain unchanged. Thus, the maintenance cost and/or negative consequences of rough handling over time are minimized by the disclosed innovation compared to prior art solutions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

What is claimed is:

1. A device comprising:
    an image sensor for converting an optical image into an electronic signal;
    a quadric reflector having a conical shape, which tapers from a wide base to an apex, said apex comprising an aperture;
    a mirror positioned within the device in a plane approximately parallel to a circular cross section of the conical shape, said mirror reflecting environmental light that is reflected by the quadric reflector into the aperture or reflecting light emitting from the aperture onto the quadric reflector;
    a cylindrical transparent spacer surrounding the quadric reflector and the mirror, wherein the cylindrical transparent spacer supports the mirror in a position substantially parallel to the cross section at a length from the aperture and the quadric reflector to ensure reflections between the quadric reflector and the aperture are suitable for a purpose of the device; and
    a set of one or more optical elements positioned at least partially within a volumetric region of the quadric reflector, said one or more optical elements focusing light passing through the aperture and comprising in order from the aperture:
        an aperture stop;
        a convex element;
        a first doublet comprising one convex element joined to one concave element, wherein the convex and concave portions face each other;

a second doublet comprising one convex element joined to one concave element, wherein the convex and concave portions face each other;
a convex element facing in substantially the opposite direction as the convex element ordered below the aperture stop;
a filter; and
a field flattener that corrects field curvature produced by the quadric reflector to permit the optical image to substantially lie on a flat focal plane.

2. The device of claim 1, wherein
said optical image resulting from light reflecting off the quadric reflector, reflecting off the mirror, passing through the aperture, being focused by the set of one or more optical elements, to be received by the image sensor.

3. The device of claim 2, wherein:
the filter blocks wavelengths that blur the optical image and result in increased color rendering errors if not filtered; and
the field flattener corrects field curvature resulting from the quadric reflector to permit the optical image to substantially lie on a flat focal plane.

4. The device of claim 1, further comprising:
a light emitter for emitting light being focused by the set of one or more optical elements, passing through the aperture, reflecting off the mirror, to reflect off the quadric reflector.

5. A device comprising:
an image sensor for converting an optical image into an electronic signal;
a quadric reflector having a conical shape, which tapers from a wide base to an apex, said apex comprising an aperture; and
a mirror positioned within the device in a plane substantially parallel to a circular cross section of the conical shape, said mirror reflecting environmental light that is reflected by the quadric reflector into the aperture or reflecting light emitting from the aperture onto the quadric reflector;
a set of lenses disposed in the quadric reflector aligned vertically with the aperture, and comprising in order from the aperture:
an aperture stop;
a convex element;
a doublet comprising one convex element joined to one concave element, wherein the convex and concave portions face each other;
a second doublet comprising one convex element joined to one concave element, wherein the convex and concave portions face each other;
a convex element facing in substantially the opposite direction as the convex element ordered below the aperture stop;
a filter; and
a field flattener that corrects field curvature produced by the quadric reflector to permit the optical image to substantially lie on a flat focal plane;
a cylindrical transparent spacer surrounding the quadric reflector and the mirror, wherein the cylindrical transparent spacer supports the mirror in a position substantially parallel to the cross section at a length from the aperture and the quadric reflector to ensure reflections between the quadric reflector and the aperture are suitable for a purpose of the device.

6. The device of claim 5, wherein the device with the quadric reflector has a horizontal field of view of three hundred and sixty degrees and has a vertical field of view that includes negative fifteen degrees to positive forty five degrees.

7. The device of claim 5, wherein
said optical image resulting from light reflecting off the quadric reflector, reflecting off the mirror, passing through the aperture, to be received by the image sensor.

8. The device of claim 7, wherein the device is a one-shot panoramic camera with a three hundred and sixty degree horizontal field of view.

9. The device of claim 8, wherein the device is a one-shot panoramic camera with a three hundred and sixty degree horizontal field of view, with a vertical field of view including an arc between negative fifteen degrees and positive forty five degrees, wherein the image sensor is a 4K or higher sensor, wherein the one-shot panoramic camera captures full motion video at least a 1080-line high definition video (HDV) standard.

10. The device of claim 5, further comprising:
a light emitter for emitting light being focused by the set of one or more optical elements, passing through the aperture, reflecting off the mirror, to reflect off the quadric reflector.

11. The device of claim 10, wherein the light emitter comprises a red light emitting diode (LED), a green light emitting diode (LED), and a blue light emitting diode (LED); said device further comprising:
a processor controlling activation of the red LED, the greed LED, and the blue LED to generate timed and patterned lighting about a three hundred and sixty degree horizontal field of view about the device.

12. The device of claim 5, further comprising a light emitter, wherein the light emitter comprises a pico chipset, wherein the device is operable as a pico-projector with a three hundred and sixty degree horizontal field of view.

13. A device comprising:
an image sensor for converting an optical image into an electronic signal, said optical image resulting from light being focused by the set optical elements, to be received by the image sensor;
a set of one or more optical elements positioned at least partially within a volumetric region of a quadric reflector, said one or more optical elements focusing light passing through an aperture of the quadric reflector as reflected off the quadric reflector onto a flat mirror disposed over the aperture, and off the flat mirror into the aperture, said set of optical elements comprising in order from the aperture:
an aperture stop:
a convex element:
a first doublet comprising one convex element joined to one concave element, wherein the convex and concave portions face each other:
a second doublet comprising one convex element joined to one concave element, wherein the convex and concave portions face each other:
a convex element facing in substantially the opposite direction as the convex element ordered below the aperture stop;
a filter; and
a field flattener that corrects field curvature produced by the quadric reflector to permit the optical image to substantially lie on a flat focal plane;
wherein the first and second doublets include one convex element joined to one concave element, wherein the convex and concave portions face each other, wherein the at least one doublet produces a converging beam of light and corrects color aberrations that would otherwise cause different colors to focus at different planes and positions;

a built in position adjusting mechanism that adjusts an alignment of the optical elements relative to each other; and a cylindrical transparent spacer surrounding the quadric reflector and the mirror, wherein the cylindrical transparent spacer supports the mirror in a position substantially parallel to the cross section at a length from the aperture and the quadric reflector to ensure reflections between the quadric reflector and the aperture are suitable for a purpose of the device.

14. The device of claim 13, wherein the aperture stop limits the bundle of light that is received by the image sensor.

15. The device of claim 13, wherein the set optical elements further comprise:
a filter for blocking infrared, violet, and ultraviolet radiation, which have wavelengths that blur the optical image and result in increased color rendering errors if not filtered.

16. The device of claim 13, wherein:
the first doublet is a first cemented doublet comprising one convex element and one concave element, wherein curvatures of the convex element and of the concave element are optical complements of each other; and
the second doublet is a second cemented doublet comprising one convex element and one concave element, wherein curvatures of the convex element and of the concave element are optical complements of each other.

* * * * *